(12) United States Patent
Aristarkhov

(10) Patent No.: US 12,192,464 B2
(45) Date of Patent: Jan. 7, 2025

(54) METHOD AND APPARATUS FOR MULTI-ADAPTER EXECUTION OF LOOK AHEAD VIDEO ENCODING

(71) Applicant: INTEL CORPORATION, Santa Clara, CA (US)

(72) Inventor: Vasily Aristarkhov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 144 days.

(21) Appl. No.: 18/018,182

(22) PCT Filed: Aug. 27, 2020

(86) PCT No.: PCT/IB2020/000828
§ 371 (c)(1),
(2) Date: Jan. 26, 2023

(87) PCT Pub. No.: WO2022/043724
PCT Pub. Date: Mar. 3, 2022

(65) Prior Publication Data
US 2023/0269375 A1 Aug. 24, 2023

(51) Int. Cl.
*H04N 7/12* (2006.01)
*H04N 19/127* (2014.01)
*H04N 19/423* (2014.01)
*H04N 19/436* (2014.01)

(52) U.S. Cl.
CPC ......... *H04N 19/127* (2014.11); *H04N 19/423* (2014.11); *H04N 19/436* (2014.11)

(58) Field of Classification Search
CPC .................................................... H04N 19/423
See application file for complete search history.

(56) References Cited

U.S. PATENT DOCUMENTS

2014/0334545 A1  11/2014  Schmit et al.
2017/0346864 A1  11/2017  Nataros et al.

OTHER PUBLICATIONS

International Search Report and Written Opinion dated Mar. 3, 2021, for Application No. PCT/IB2020/000828 (12 pages).
Momcilovic et al., "Dynamic Load Balancing for Real-Time Video Encoding on Heterogeneous CPU+GPU Systems", US (Jan. 1, 2014), vol. 16, No. 1, p. 108-121, Retrieved from the Internet: URL:https://ieeexplore.ieee.org/stampPDF/getPDF.jsp?tp=&arnumber=6626595&ref=aHR0cHM6Ly9pZWVleHBsb3JlLmllZWUub3JnL2RvY3VZW50LzY2MjY1OTU= DOI: 10.1109/TMM.2013.2284892.

*Primary Examiner* — Y Lee
(74) *Attorney, Agent, or Firm* — KDW Firm PLLC

(57) ABSTRACT

A multi-adapter encoding process where the first adapter is used to execute a look-ahead encoding process while the second adapter is used to execute a main encoding process is provided. The look-ahead encode and main encode can be executed concurrently on the different adapters. Additionally, the first adapter can execute the look-ahead encoding process without feedback from the second adapter, or the main encoding process.

17 Claims, 11 Drawing Sheets

METHOD AND APPARATUS FOR MULTI-ADAPTER EXECUTION OF LOOK AHEAD VIDEO ENCODING

CROSS-REFERENCE TO RELATED APPLICATION

This application is a national phase claiming the benefit of and priority to International Patent Application No. PCT/IB2020/000828, entitled "METHOD AND APPARATUS FOR MULTI-ADAPTER EXECUTION OF LOOK AHEAD VIDEO ENCODING" filed Aug. 27, 2020, which is hereby incorporated by reference in its entirety.

BACKGROUND

The computing requirements to encode media content (e.g., video streams, game streams, etc.) increases as the resolution, or quality, of the media content increases. For example, the compute requirements to encode a 4 k or 8 k video stream are significantly greater than the compute requirements needed to encode 2 k or high definition (HD) (e.g., 1080, or the like) video streams. Additionally, compute requirements are increased as the depth or sampling rate increases.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

In general, the present disclosure provides to encode video frames where a first graphics processing unit (GPU) operates to execute first-pass encode, or look ahead, while a second GPU operates to execute the main encoding operations. As such, first-pass encode and main encode can be executed concurrently on the different adapters. This can provide better total performance or could provide better encoding quality with the same performance vs encoding the video frames using a single adapter.

With some examples, first-pass encode, or look-ahead, can be implemented in a codec agnostic style without negative video quality impact. As such, the present disclosure can be implemented in systems that use combinations of adapters with different encoding capabilities. As another example, a system with a first GPU having modest graphical compute and memory resources can be provisioned to execute the first-pass encode, or look ahead, while a second GPU having greater graphical compute and/or memory resources than the first GPU can be provisioned to execute the main encode.

In some examples the present disclosure can be provided for in systems that rely on an application programming interface (API) where call to the adapters are issued via the API. Furthermore, the present disclosure can be applied to encode frames using combinations of encoding schemes, such as, for example, group of pictures (GOP) frame splitting.

In the following description, numerous specific details such as processor and system configurations are set forth in order to provide a more thorough understanding of the described embodiments. However, the described embodiments may be practiced without such specific details. Additionally, some well-known structures, circuits, and the like have not been shown in detail, to avoid unnecessarily obscuring the described embodiments.

Figure 1:
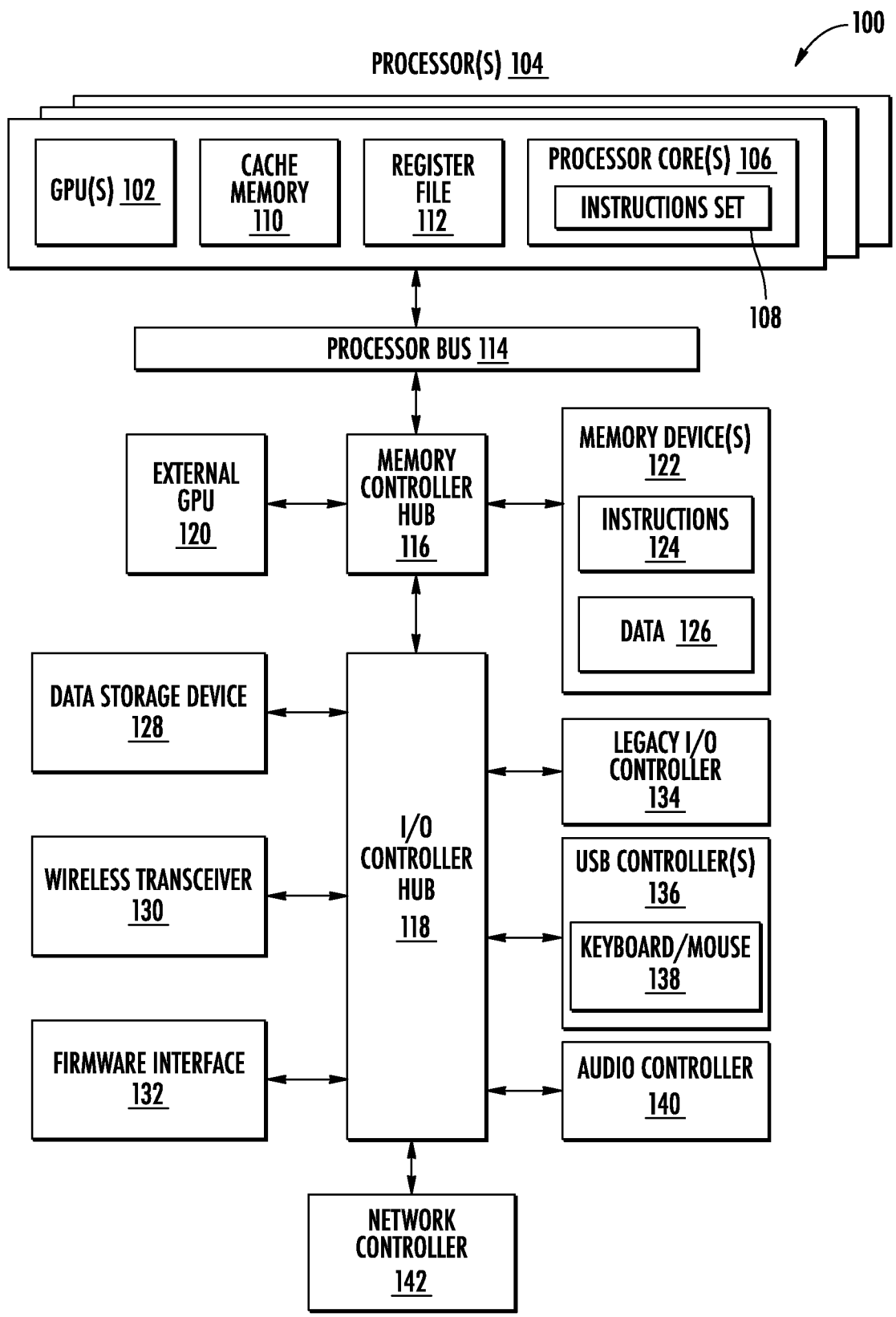
FIG. 1 illustrates a processing system in accordance with the disclosure.

FIG. 1 is a block diagram of a processing system 100, according to an embodiment. As introduced above, the present disclosure is directed towards executing a first-pass encoding on a first GPU adapter and executing a main encoding on a second GPU adapter. As such, processing system 100 includes at least multiple graphics processing units 102. That is, processing system 100 can include multiple processors 104 each with one or more graphics processing units 102. Alternatively, processing system 100 can include a processor 104 having multiple graphics processing units 102. As another alternative, processing system 100 can include a processor 104 having a graphics processing unit 102 coupled to another GPU (e.g., external graphics processing unit 120, or the like). Processing system 100 may be a single processor desktop system, a multiprocessor workstation system, a server system having a large number of processors 104 or processor cores 106. In one embodiment, the processing system 100 is a processing platform incorporated within a system-on-a-chip (SoC) integrated circuit for use in mobile, handheld, or embedded devices. Examples are not limited in this context.

An embodiment of processing system 100 can include, or be incorporated within a server-based gaming platform, a game console, including a game and media console, a mobile gaming console, a handheld game console, or an online game console. In some embodiments processing system 100 is a mobile phone, smart phone, tablet computing device or mobile Internet device. Processing system 100 can also include, couple with, or be integrated within a wearable device, such as a smart watch wearable device, smart eyewear device, augmented reality device, or virtual reality device. In some embodiments, processing system 100 is a television or set top box device having one or more processors 104 and a graphical interface generated by the graphics processing units 102.

In some embodiments, the one or more processors 104 each include one or more processor cores 106 to process instructions which, when executed, perform operations for system and user software. In some embodiments, each of the one or more processor cores 106 is configured to process a specific instruction set 108. In some embodiments, instruction set 108 may facilitate Complex Instruction Set Computing (CISC), Reduced Instruction Set Computing (RISC), or computing via a Very Long Instruction Word (VLIW). Multiple processor cores 106 may each process a different instruction set 108, which may include instructions to facilitate the emulation of other instruction sets. Processor cores 106 may also include other processing devices, such a Digital Signal Processor (DSP).

In some embodiments, the processors 104 include cache memory 110. Depending on the architecture, the processors 104 can have a single internal cache or multiple levels of internal cache. In some embodiments, the cache memory 110 is shared among various components of the processors 104. In some embodiments, the processors 104 also uses an external cache (e.g., a Level-3 (L3) cache or Last Level Cache (LLC)) (not shown), which may be shared among processor cores 106 using known cache coherency techniques. A register file 112 is additionally included in processors 104 which may include different types of registers for storing different types of data (e.g., integer registers, floating point registers, status registers, and an instruction pointer register). Some registers may be general-purpose registers, while other registers may be specific to the design of the processor 104.

In some embodiments, processors 104 are coupled with a processor bus 114 to transmit communication signals such as address, data, or control signals between processors 104 and other components in processing system 100. In one embodiment the processing system 100 uses an exemplary 'hub' system architecture, including a memory controller hub 116 and an input output, or I/O controller hub 118. Memory controller hub 116 facilitates communication between a memory devices 122 or memory devices 122 and other components of processing system 100, while I/O controller hub 118 provides connections to I/O devices via a local I/O bus. In one embodiment, the logic of the memory controller hub 116 is integrated within the processor.

Memory device 122 can be a dynamic random access memory (DRAM) device, a static random access memory (SRAM) device, flash memory device, phase-change memory device, or some other memory device having suitable performance to serve as process memory. In one embodiment the memory device 122 can operate as system memory for the processing system 100, to store data 126 and instructions 124 for use when the one or more processors 104 executes an application or process. Memory controller hub 116 also couples with an optional external graphics processing unit 120, which may communicate with the one or more graphics processing units 102 in processors 104 to perform graphics and media operations as described more completely herein. In general, data 126 can be a video steam (e.g., raw video frames, or the like) to be encoded as described herein. Additionally, data can be encoded frames and/or parameters related to the encoding.

In some embodiments, I/O controller hub 118 enables peripherals to connect to memory devices 122 and processor 104 via a high-speed I/O bus. The I/O peripherals include, but are not limited to, data storage device 128 (e.g., hard disk drive, flash memory, etc.), wireless transceiver 130 (e.g., Wi-Fi, Bluetooth, RFID, ZigBee, 4G, 5G, etc.), firmware interface 132, legacy I/O controller 134 (e.g., personal system 2(PS/2, or the like), universal serial bus, or USB controller 136 to connect to I/O devices such as, keyboard and/or mouse 138, and/or audio controller 140. A network controller 142 may also couple with I/O controller hub 118. In some embodiments, a high-performance network controller (not shown) couples with processor bus 114. It will be appreciated that the processing system 100 shown is exemplary and not limiting, as other types of data processing systems that are differently configured may also be used. For example, the I/O controller hub 118 may be integrated within the one or more processor 104, or the memory controller hub 116 and I/O controller hub 118 may be integrated into a discreet external graphics processor, such as external graphics processing unit 120.

Figure 2:
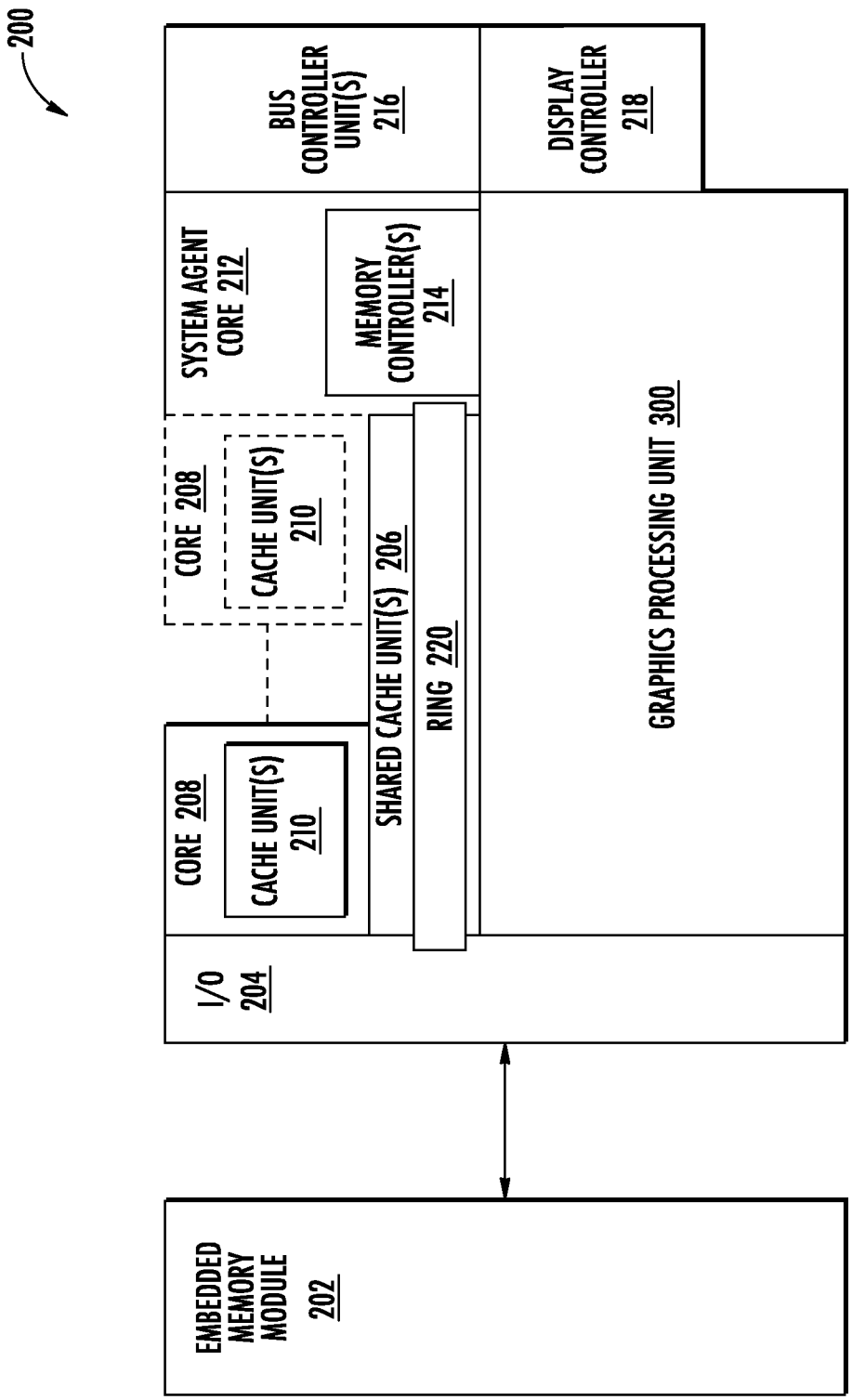
FIG. 2 illustrates a processor in accordance with the disclosure.

FIG. 2 is a block diagram of an embodiment of a processor 200 having one or more cores 208, an integrated memory controller 214, and an integrated graphics processing unit 300. Those elements of FIG. 2 having the same reference numbers (or names) as the elements of any other figure herein can operate or function in any manner similar to that described elsewhere herein, but are not limited to such. Processor 200 can include additional cores up to and including any number of cores (e.g., 2, 4, 6, 8, 12, 16, 32, etc.). Each of cores 208 includes one or more internal cache units 210. In some embodiments each processor core also has access to one or more shared cached shared cache units 206.

The internal cache units 210 and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units (e.g., shared cache units 206, cache units 210, etc.).

In some embodiments, processor 200 may also include a set of one or more bus controller units 216 and a system agent core 212. The one or more bus controller units 216 manage a set of peripheral buses, such as one or more Peripheral Component Interconnect buses (e.g., PCI, PCI Express). System agent core 212 provides management functionality for the various processor components. In some embodiments, system agent core 212 includes one or more integrated memory controllers 214 to manage access to various external memory devices (not shown).

In some embodiments, one or more of the cores 208 include support for simultaneous multi-threading. In such embodiment, the system agent core 212 includes components for coordinating and operating cores 208 during multi-threaded processing. System agent core 212 may additionally include a power control unit (PCU), which includes logic and components to regulate the power state of cores 208 and graphics processing unit 300.

In some embodiments, processor 200 additionally includes graphics processing unit 300 to execute graphics processing operations. In some embodiments, the graphics processing unit 300 couples with the set of shared cache units 206, and the system agent core 212, including the one or more integrated memory controllers 214. In some embodiments, a display controller 218 is coupled with the graphics processing unit 300 to drive output from the graphics processing unit 300 to one or more coupled displays (not shown). In some embodiments, display controller 218 may be a separate module coupled with the graphics processing unit 300 via at least one interconnect, or may be integrated within the graphics processing unit 300 or system agent core 212.

In some embodiments, a ring interconnect unit 220 is used to couple the internal components of the processor 200. However, an alternative interconnect unit may be used, such as a point-to-point interconnect, a switched interconnect, or other techniques, including techniques well known in the art. In some embodiments, graphics processing unit 300 couples with the ring interconnect unit 220 via an I/O link 204.

The exemplary I/O link 204 represents at least one of multiple varieties of I/O interconnects, including an on package I/O interconnect which facilitates communication between various processor components and one or more high-performance embedded memory modules 202, such as an eDRAM module. In some embodiments, each of the cores 208 and graphics processing unit 300 use embedded memory modules 202 as a shared Last Level Cache.

In some embodiments, cores 208 are homogenous cores executing the same instruction set architecture. In another embodiment, cores 208 are heterogeneous in terms of instruction set architecture (ISA), where one or more of cores 208 execute a first instruction set, while at least one of the other cores executes a subset of the first instruction set or a different instruction set. In one embodiment cores 208 are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
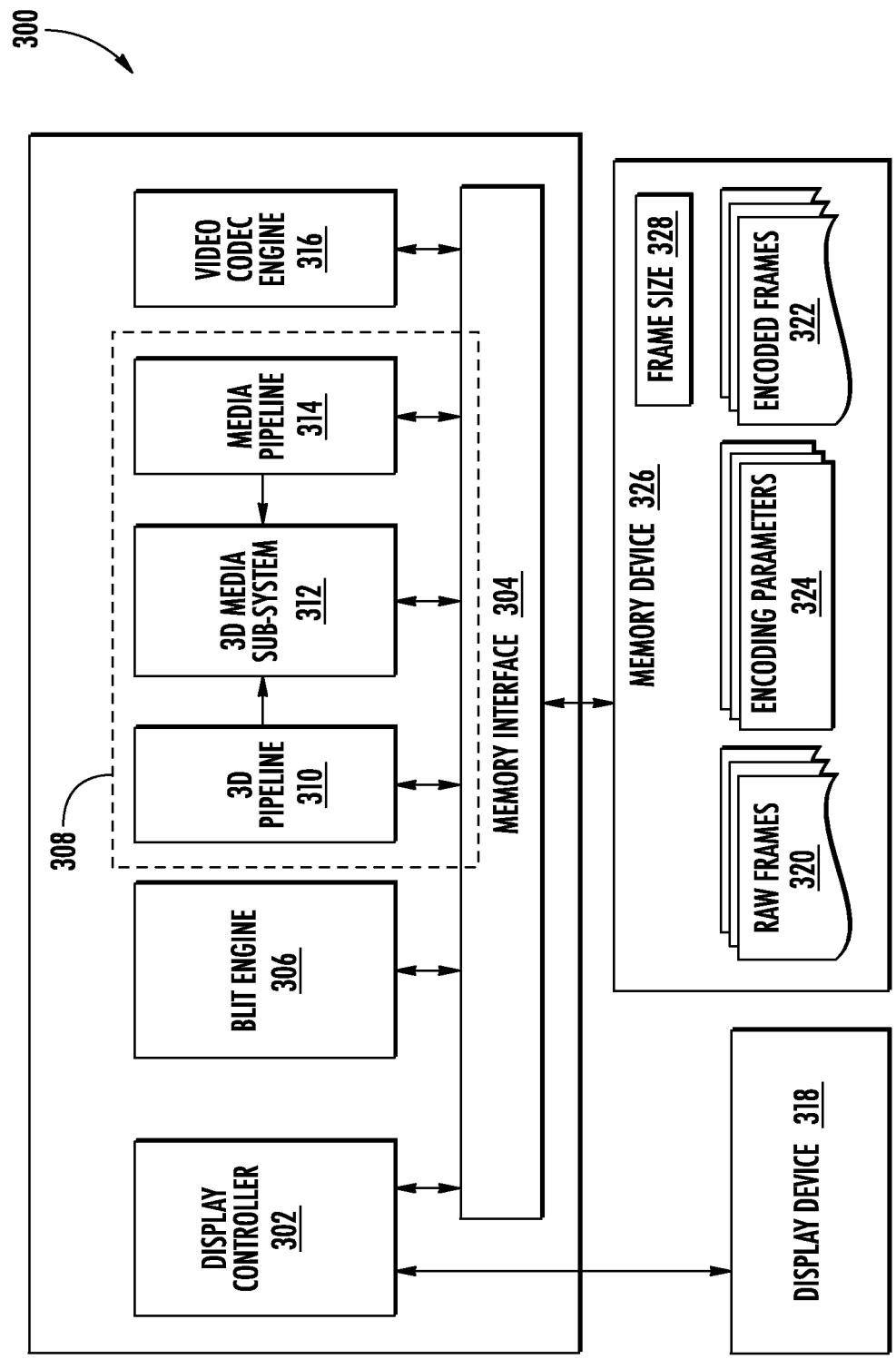
FIG. 3 illustrates a graphics processing unit in accordance with the disclosure.

FIG. 3 is a block diagram of a graphics processing unit 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processing unit 300 includes a memory interface 304 to access memory device 326. Memory interface 304 can be an interface to local memory, one or more internal caches, one or more shared external caches, and/or to system memory.

In some embodiments, graphics processing unit 300 also includes a display controller 302 to drive display output data to a display device 318. Display controller 302 includes hardware for one or more overlay planes for the display and composition of multiple layers of video or user interface elements. In some embodiments, graphics processing unit 300 includes a video codec engine 316 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In some embodiments, graphics processing unit 300 includes a block image transfer (BLIT) engine 306 to perform two-dimensional (2D) rasterizer operations including, for example, bit-boundary block transfers. However, in one embodiment, 2D graphics operations are performed using one or more components of a graphics processing engine (GPE) 308. In some embodiments, GPE 308 is a compute engine for performing graphics operations, including three-dimensional (3D) graphics operations and media operations.

In some embodiments, GPE 308 includes a 3d pipeline 310 for performing 3D operations, such as rendering three-dimensional images and scenes using processing functions that act upon 3D primitive shapes (e.g., rectangle, triangle, etc.). The 3d pipeline 310 includes programmable and fixed function elements that perform various tasks within the element and/or spawn execution threads to a 3d media sub-system 312. While 3d pipeline 310 can be used to perform media operations, an embodiment of GPE 308 also includes a media pipeline 314 that is specifically used to perform media operations, such as video post-processing and image enhancement.

In some embodiments, media pipeline 314 includes fixed function or programmable logic units to perform one or more specialized media operations, such as video decode acceleration, video de-interlacing, and video encode acceleration in place of, or on behalf of video codec engine 316. In some embodiments, media pipeline 314 additionally includes a thread spawning unit to spawn threads for execution on 3d media sub-system 312. The spawned threads perform computations for the media operations on one or more graphics execution units included in 3d media sub-system 312.

In some embodiments, 3d media sub-system 312 includes logic for executing threads spawned by 3d pipeline 310 and media pipeline 314. In one embodiment, the pipelines send thread execution requests to 3d media sub-system 312, which includes thread dispatch logic for arbitrating and dispatching the various requests to available thread execution resources. The execution resources include an array of graphics execution units to process the 3D and media threads. In some embodiments, 3d media sub-system 312 includes one or more internal caches for thread instructions and data. In some embodiments, the subsystem also includes shared memory, including registers and addressable memory, to share data between threads and to store output data.

During operation, GPE 308 can operate to encode raw frames 320. More specifically, GPE 308 can operate to execute a first-pass encoding over raw frames 320 to generate encoding parameters 324. Alternatively, GPE 308 can operate to execute a main encoding scheme to encode raw frames 320 based on encoding parameters 324 to generate encoded frames 322. The encoded frames 322 have a frame size 328.

Figure 4:
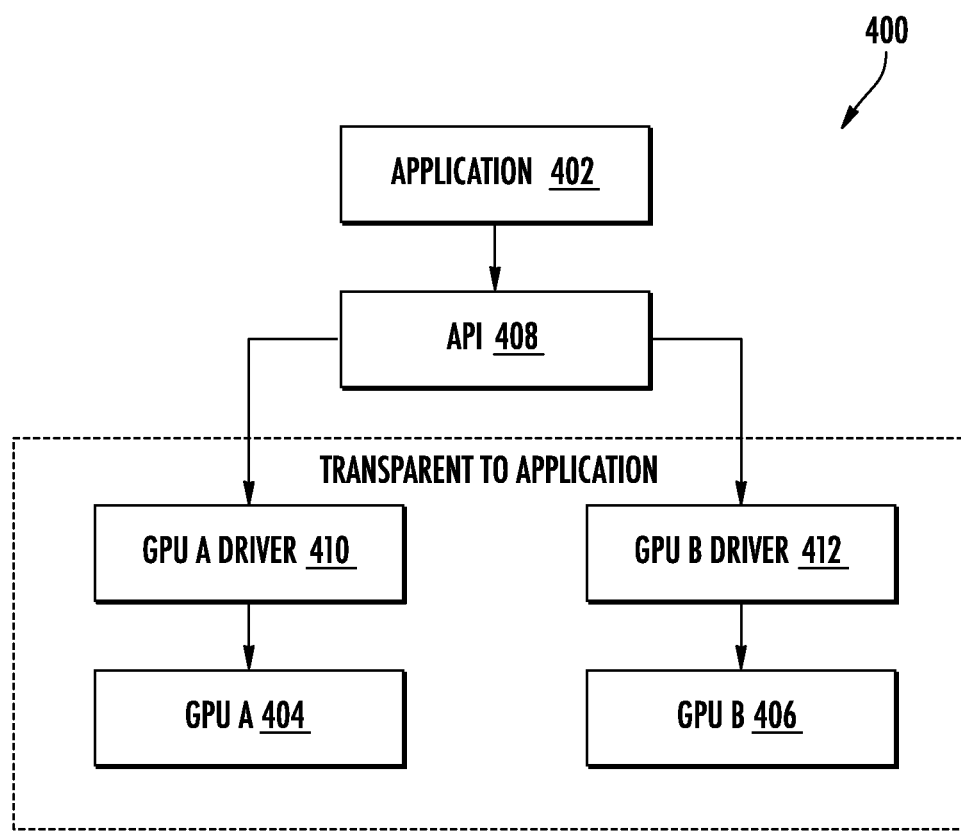
FIG. 4 illustrates an aspect of the subject matter in accordance with one embodiment.

FIG. 4 illustrates an application architecture 400. Application architecture 400 includes an application 402 arranged to call, for example, via API 408, a two-pass encoding process as described herein. With some examples, application 402 can call the two-pass encoding scheme as it would call a single adapter encoding scheme. That is, the API 408 is configured to execute the two-pass encoding schema as detailed herein, responsive to a call to a single adapter scheme.

The API 408 operates to cause the first GPU (e.g., GPU A 404), via GPU A driver 410, to execute the first-pass encode, or the look ahead encode. GPU A 404, responsive to the commands of the GPU A driver 410 initiated by API 408 can gather statistics about the complexity of frames (e.g., raw frames 320, or the like) and the temporal correlation between the frames. GPU A 404 can generate encoding parameters 324 which can be provided to the second GPU (e.g., GPU B 406) for the main encoding scheme. With some examples, encoding parameters 324 can include a bitrate budget, best possible reference frames list, GOP structure, quantization matrices, etc. In general, GPU A 404 can execute the look ahead encode on downscaled versions of the raw frames. As such, GPU A 404 can determine consistent statistics (e.g., encoding parameters 324, or the like)

using less computational resources than would be required to execute the look ahead encode on the un-downscaled raw frames.

Additionally, the API 408 operates to cause the second GPU (e.g., GPU B 406), via GPU B driver 412, to execute the main encode. GPU B 406, responsive to the commands of the GPU B driver 412 initiated by API 408 can encode the raw frames 320 based on the encoding parameters 324 to generate encoded frames 322.

Figure 5A:
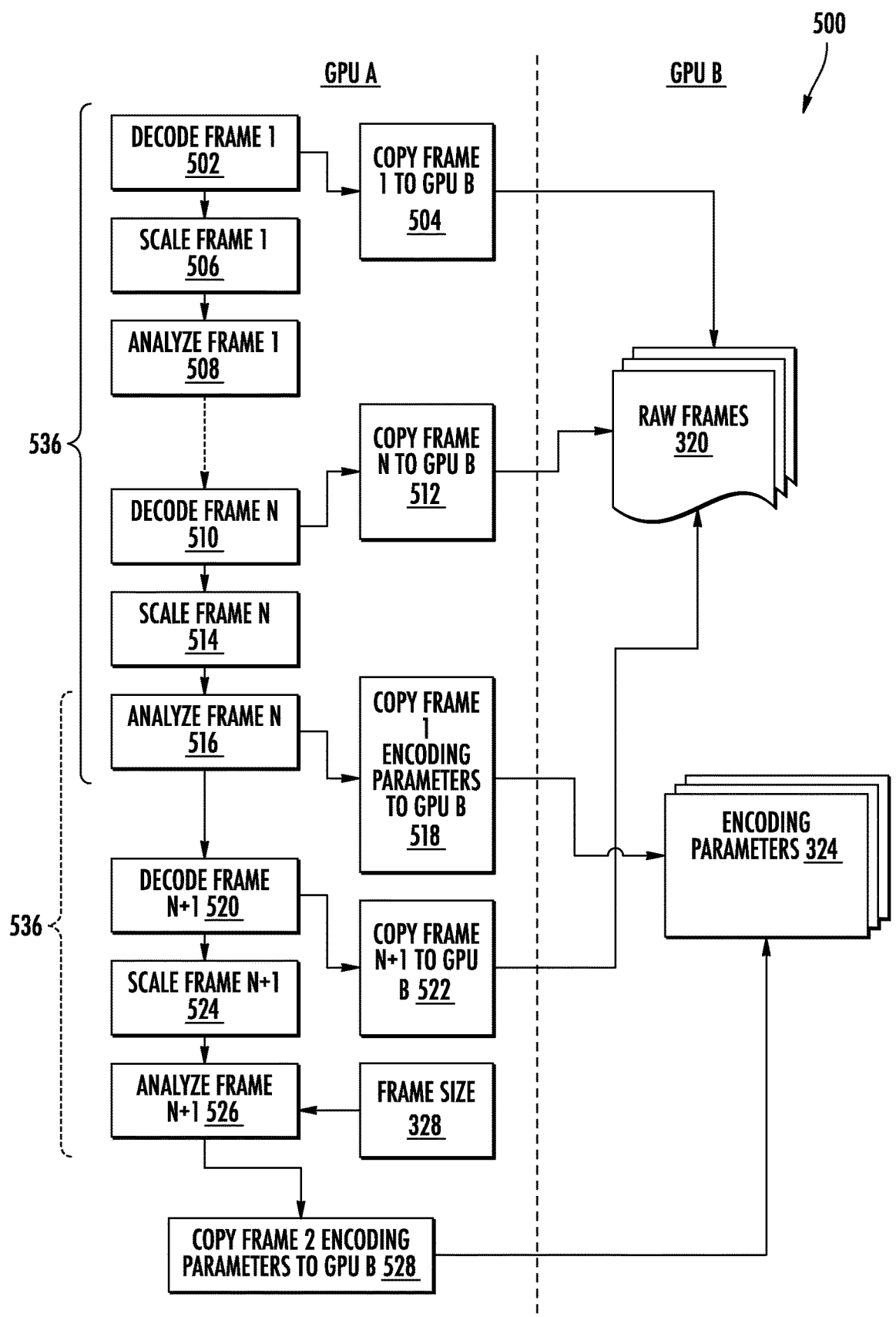
FIG. 5A illustrates an aspect of the subject matter in accordance with one embodiment.
Figure 5B:
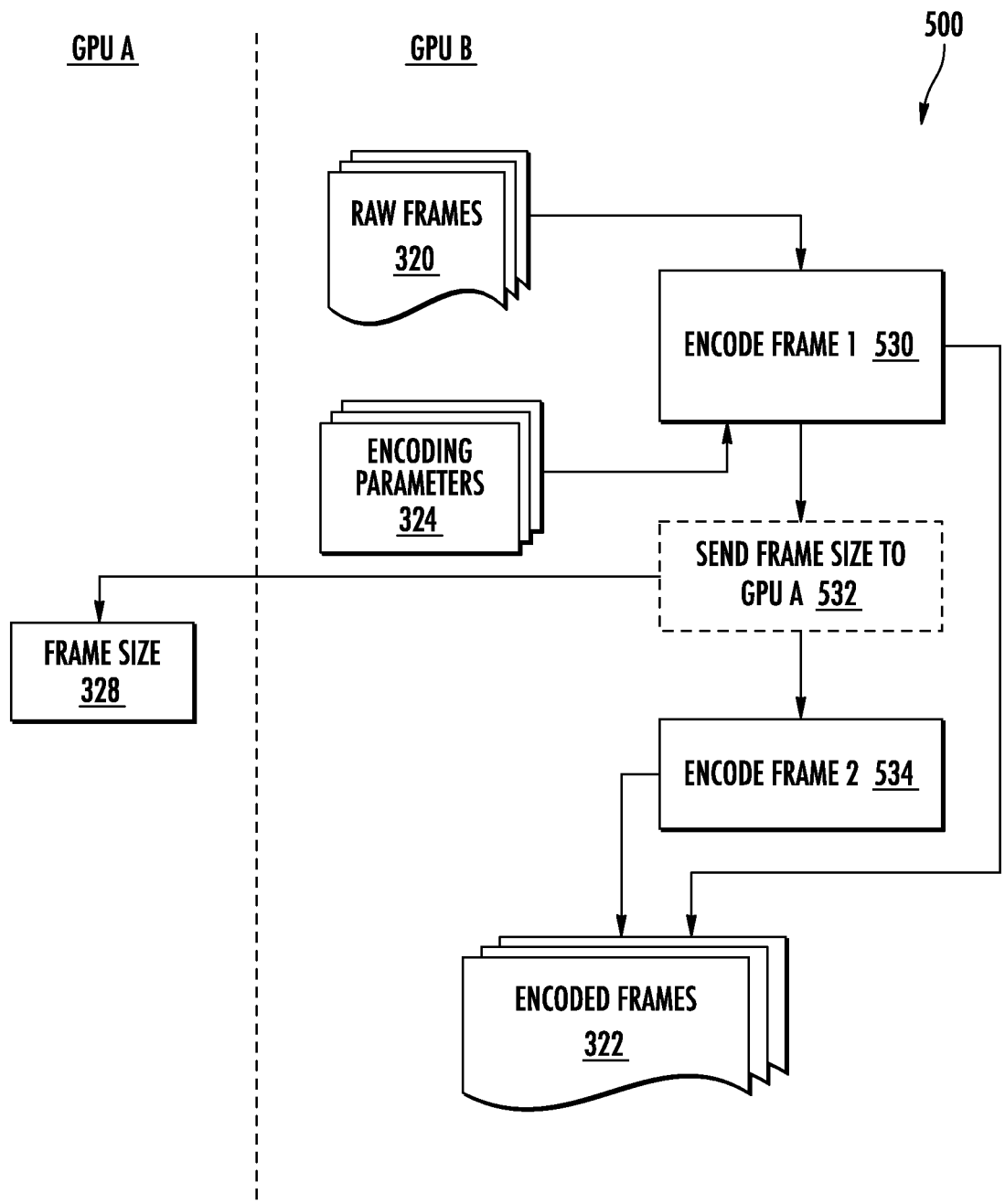
FIG. 5B illustrates an aspect of the subject matter in accordance with one embodiment.

FIG. 5A and FIG. 5B illustrate a logic flow 500 detailing a multi-adapter encoding process, according to the present disclosure. Logic flow 500 includes operations associated with a first GPU (e.g., GPU A 404 and a second GPU (e.g., GPU B 406). That is, logic flow 500 can be implemented by a multi-GPU adapter system (e.g., processing system 100, or the like). For example, in some implementations, the first GPU can be an integrated GPU (e.g., graphics processing unit 102, or the like) while the second GPU can be a discrete GPU (e.g., external graphics processing unit 120, or the like). Examples are not limited in this context.

In general, FIG. 5A details operations of logic flow 500 associated with a first GPU (e.g., GPU A 404, or the like) while FIG. 5B details operations of logic flow 500 associated with a second GPU (e.g., GPU B 406, or the like). Furthermore, it is to be appreciated that FIG. 5A details operations of logic flow 500 associated with a look-ahead encoding portion of an overall encoding process while FIG. 5B details operations of logic flow 500 associated with a main encoding portion of an overall encoding process.

Logic flow 500 can begin at block 502. At block 502 "decode frame 1" graphics processing circuitry can decode a first video frame. For example, a first GPU (e.g., graphics processing unit 102, GPU A 404, or the like) can decode a first frame of a video stream. Continuing to block 506 "scale frame 1" graphics processing circuitry can scale the first video frame. For example, a first GPU (e.g., graphics processing unit 102, GPU A 404, or the like) can scale the first frame of the video stream. Continuing to block 508 "analyze frame 1" graphics processing circuitry can analyze the first video frame. For example, a first GPU (e.g., graphics processing unit 102, GPU A 404, or the like) can analyze the first frame of the video stream.

In general, block 502, block 506, and block 508, or the decoding, scaling, and analyzing operations can include operations to analyze a frame to determine a best encoding scheme or parameters. Any of a variety of look-ahead encoding mechanisms can be employed. Logic flow 500 includes a look ahead window 536 in which a number of frames are decoded, scaled, and analyzed to determine a set of encoding parameters 324 to use for a frame (or frames). For example, logic flow 500 depicts look ahead window 536 comprising frame 1 to frame N in which encoding parameters 324 for frame 1 are determined. In general, N can be any number. For example, N can be defaulted to 40, N can be between 10 and 60, N can be selected by a user, N can be determined based on the graphical compute resources of the first GPU, or the like. Furthermore, it is noted that blocks 502 and 506 for decoding and scaling are optional. Said differently, logic flow 500 could be implemented by an application arranged to provide raw frames 320 natively, which frames do not require decoding or scaling. Likewise, other blocks for decoding and scaling (e.g., block 510, block 514, block 520, block 524, etc.,) are optional.

Continuing within the look ahead window 536, logic flow 500 includes block 510, block 514, and block 516. At block 510 "decode frame N" graphics processing circuitry can decode frame N of the video stream. For example, a first GPU (e.g., graphics processing unit 102, GPU A 404, or the like) can decode frame N of the video stream. Continuing to block 514 "scale frame N" graphics processing circuitry can scale frame N. For example, a first GPU (e.g., graphics processing unit 102, GPU A 404, or the like) can scale frame N of the video stream. Continuing to block 516 "analyze frame 1" graphics processing circuitry can analyze frame N. For example, a first GPU (e.g., graphics processing unit 102, GPU A 404, or the like) can analyze frame N of the video stream.

It is noted, that logic flow 500 includes blocks not depicted, for example, look ahead window 536 includes blocks to decode, scale and analyze frames 2 to N−1. However, for convenience and clarity, these blocks are not shown. Further, logic flow 500 includes blocks to copy frames to the second GPU. For example, logic flow 500 depicts block 504 and block 512. At block 504 "copy frame 1 to GPU B" graphics processing circuitry can copy the first frame (e.g., as part of raw frames 320, or the like) to the second GPU. For example, a first GPU (e.g., graphics processing unit 102, GPU A 404, or the like) can copy the first frame to a second GPU (e.g., external graphics processing unit 120, GPU B 406, or the like). Likewise, at block 512 "copy frame N to GPU B" graphics processing circuitry can copy frame N to the second GPU. For example, a first GPU (e.g., graphics processing unit 102, GPU A 404, or the like) can copy frame N to a second GPU (e.g., external graphics processing unit 120, GPU B 406, or the like).

At the conclusion of the look ahead window 536, logic flow 500 includes block 518. At block 518 "copy frame 1 encoding parameters to GPU B" graphics processing circuitry can copy encoding parameters to the second GPU. For example, a first GPU (e.g., graphics processing unit 102, GPU A 404, or the like) can copy encoding parameters 324 to a second GPU (e.g., external graphics processing unit 120, GPU B 406, or the like).

Logic flow 500 can operate with a rolling look ahead window, for example, look ahead window 536 can be rolled forward to include frames 2 to N+1, where encoding parameters for frame 2 are generated. Accordingly, logic flow 500 is depicted including block 520, block 522, block 524, block 526 and block 528 associated with generating encoding parameters for frame 2.

In particular, at block 520 "decode frame N+1" graphics processing circuitry can decode frame N+1 of the video stream. For example, a first GPU (e.g., graphics processing unit 102, GPU A 404, or the like) can decode frame N+1 of the video stream. Continuing to block 522 "copy frame N+1 to GPU B" graphics processing circuitry can copy frame N+1 to the second GPU. For example, a first GPU (e.g., graphics processing unit 102, GPU A 404, or the like) can copy frame N+1 to a second GPU (e.g., external graphics processing unit 120, GPU B 406, or the like). Continuing to block 524 "scale frame N+1" graphics processing circuitry can scale frame N+1. For example, a first GPU (e.g., graphics processing unit 102, GPU A 404, or the like) can scale frame N+1 of the video stream. Continuing to block 526 "analyze frame 1" graphics processing circuitry can analyze frame N+1. For example, a first GPU (e.g., graphics processing unit 102, GPU A 404, or the like) can analyze frame N+1 of the video stream. In some examples, at block 526, the first GPU can receive (e.g., from the second GPU) an indication of the frame size 328.

At block 528 "copy frame 2 encoding parameters to GPU B" graphics processing circuitry can copy encoding parameters to the second GPU. For example, a first GPU (e.g., graphics processing unit 102, GPU A 404, or the like) can copy encoding parameters 324 to a second GPU (e.g., external graphics processing unit 120, GPU B 406, or the like).

Turning to FIG. 5B, logic flow 500 can include block 530. At block 530 "encode frame 1" graphics processing circuitry can encode frame 1 of the video stream. For example, the second graphics processing circuitry (e.g., external graphics processing unit 120, GPU B 406, or the like) can encode frame 1 based on raw frames 320 and encoding parameters 324. Continuing to block 534 "encode frame 2" graphics processing circuitry can encode frame 2 of the video stream. For example, the second graphics processing circuitry (e.g., external graphics processing unit 120, GPU B 406, or the like) can encode frame 2 based on raw frames 320 and encoding parameters 324, resulting in encoded frames 322.

Logic flow 500 can optionally, include block 532. At block 532 "send frame size to GPU A" graphics processing circuitry can send the frame size 328 to the first graphics processing unit. For example, second graphics processing circuitry (e.g., external graphics processing unit 120, GPU B 406, or the like) can send an indication of the frame size 328 to the first graphics processing circuitry (e.g., graphics processing unit 102, GPU A 404, or the like). It is noted that block 532 is optional. In particular, some encoder schemes require information about the encoded frame size for various first-pass analyses (e.g., constant bit rate (CBR) adjustments, or the like).

Figure 6:
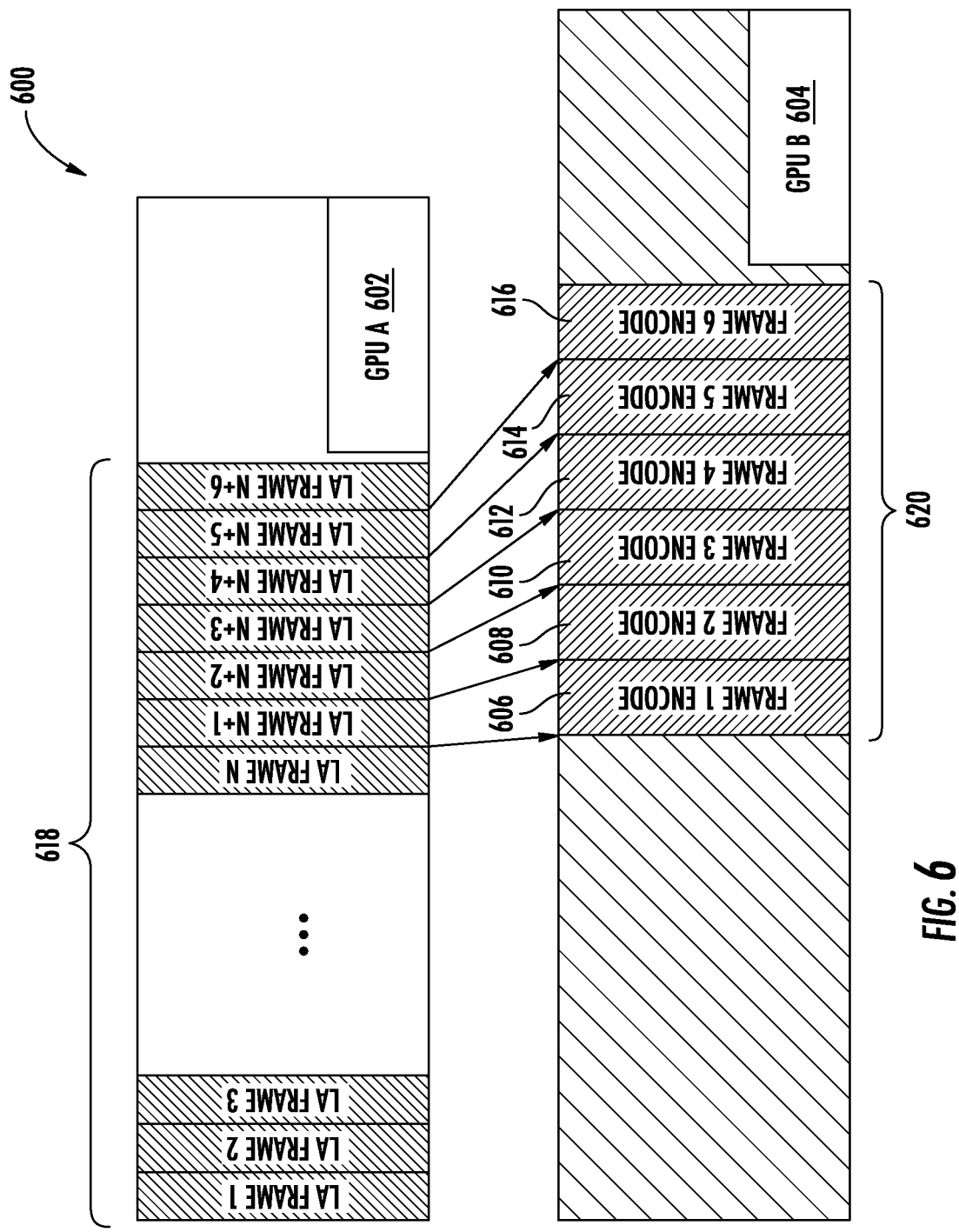
FIG. 6 illustrates an aspect of the subject matter in accordance with one embodiment.

FIG. 6 illustrates a block diagram showing a technique 600 for multi-adapter look ahead encoding of frames. In particular, this figure details encoding of a number of frames where GPU A 602 and GPU B 604 are depicted encoding the number of frames. More specifically, GPU A 602 is depicted performing a look-ahead encoding process on a number of frames while GPU B 604 is depicted performing main encoding of the number of frames. As depicted, GPU A 602 and GPU B 604 execute in concert to provide for the encoding of frames 1 to 6 (e.g., frame 606, frame 608, frame 610, frame 612, frame 614, and frame 616).

In particular, GPU A 602 is depicted executing a first pass encoding to provide encoding parameters for frames 1 to 6 (e.g., frame 606, frame 608, frame 610, frame 612, frame 614, and frame 616) over a look-ahead window of N frames. For example, GPU A 602 is depicted executing look-ahead encoding 618 for frames 1 to N+6. Additionally, GPU B 604 is depicted executing main encoding 620 for frames 1 to 6.

It is to be appreciated that this figure illustrates a multi-adapter encoding schema as described herein. For example, this figure illustrates encoding frames by a multi-adapter system (e.g., processing system 100, application architecture 400, or the like) implementing a multi-adapter encoding process (e.g., logic flow 500, or the like). As illustrated by this figure, the present disclosure provides a two-pass encoding process with one-way synchronization between adapter. Said differently, the present disclosure provides an advantage in that the GPU executing the first pass (e.g., GPU A 602) does not have dependency from the GPU executing the main encode (e.g., GPU B 604). This provides an advantage in that the GPU executing the look-ahead pass does not need to wait on encoding of a frame before moving the look ahead window and continuing execution.

The present disclosure provides other advantages. For example, conventional multi-adapter video encoding techniques often leads to the output video quality degradation, for example, due to the parallelization and splitting of the encoding between adapters. As a specific example, where slices of frames are fed to several adapters independently, the adapters (e.g., encoder process, or the like) cannot use correlation between the slices for efficient entropy coding.

Another advantage of the present disclosure is that the present disclosure can be applied to multi-adapter group-of-picture (GOP) encoding where the GOP has unknown (e.g., theoretically infinite, or the like) size or the GOP is extremely long and does not include B frames. As a specific example, the present disclosure can be applied to encode streaming media where the GOP size is 256.

Furthermore the present disclosure provides an advantage in that the adapters (e.g., GPUs) do not need to support the same encoding codecs. As a specific example, the GPU executing the first pass (e.g., GPU A 602) could use one encoding codec (e.g., HEVC, or the like) while the GPU executing the main encode (e.g., GPU B 604) could use a different (or the same) encoding codec (e.g., AVC, AV-1, HEVC, or the like). Thus, the present disclosure could be implemented by a system including a non-traditional adapters. For example, the present disclosure could be implemented by a system where the first-pass is executed by circuitry such as a CPU, an FPGA, an ASIC, a GPU, while the main encode is executed by a CPU or a GPU.

Figure 7:
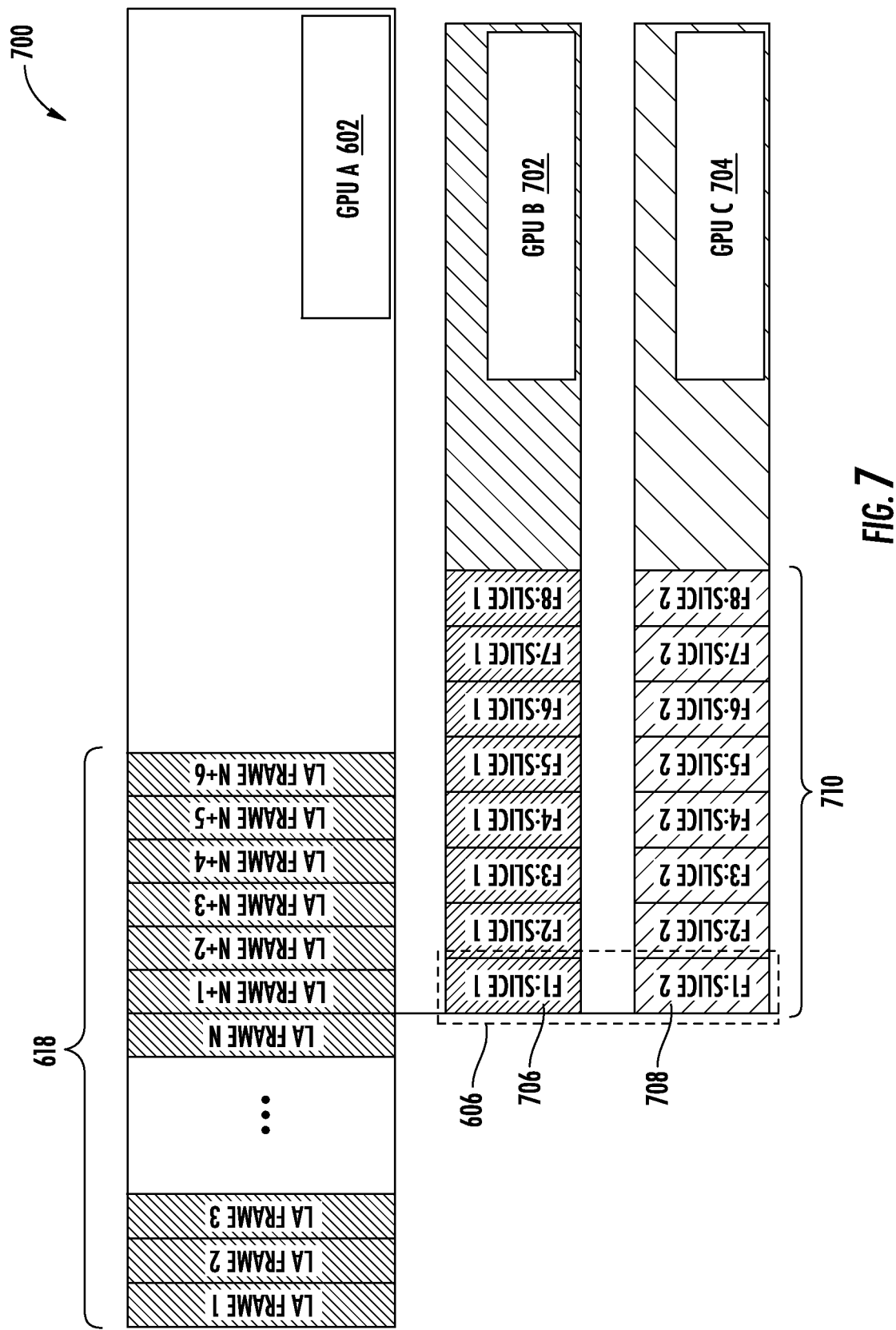
FIG. 7 illustrates an aspect of the subject matter in accordance with one embodiment.

FIG. 7 illustrates a block diagram showing technique 700 for multi-adapter look ahead encoding of frames where the look-ahead or first pass encoding of the present disclosure is combined with a slice based main encoding. Like FIG. 6, this figure depicts GPU A 602. In particular GPU A 602 is depicted performing the look-ahead encode 618 on a number of frames to generate encoding parameters (e.g., encoding parameters 324, or the like) as described herein.

FIG. 7 further depicts GPU B 702 and GPU C 704. GPU B 702 and GPU C 704 are arranged to execute a slice based main encode 710 using the encoding parameters generated by GPU A 602. For example, GPU B 702 is depicted executing main encode for a first group of slices (e.g., slice 706) of the frames (e.g., frame 606, etc.) while GPU C 704 is depicted executing main encode for a second group of slices (e.g., slice 708) of the frames (e.g., frame 606, etc.).

Figure 8:
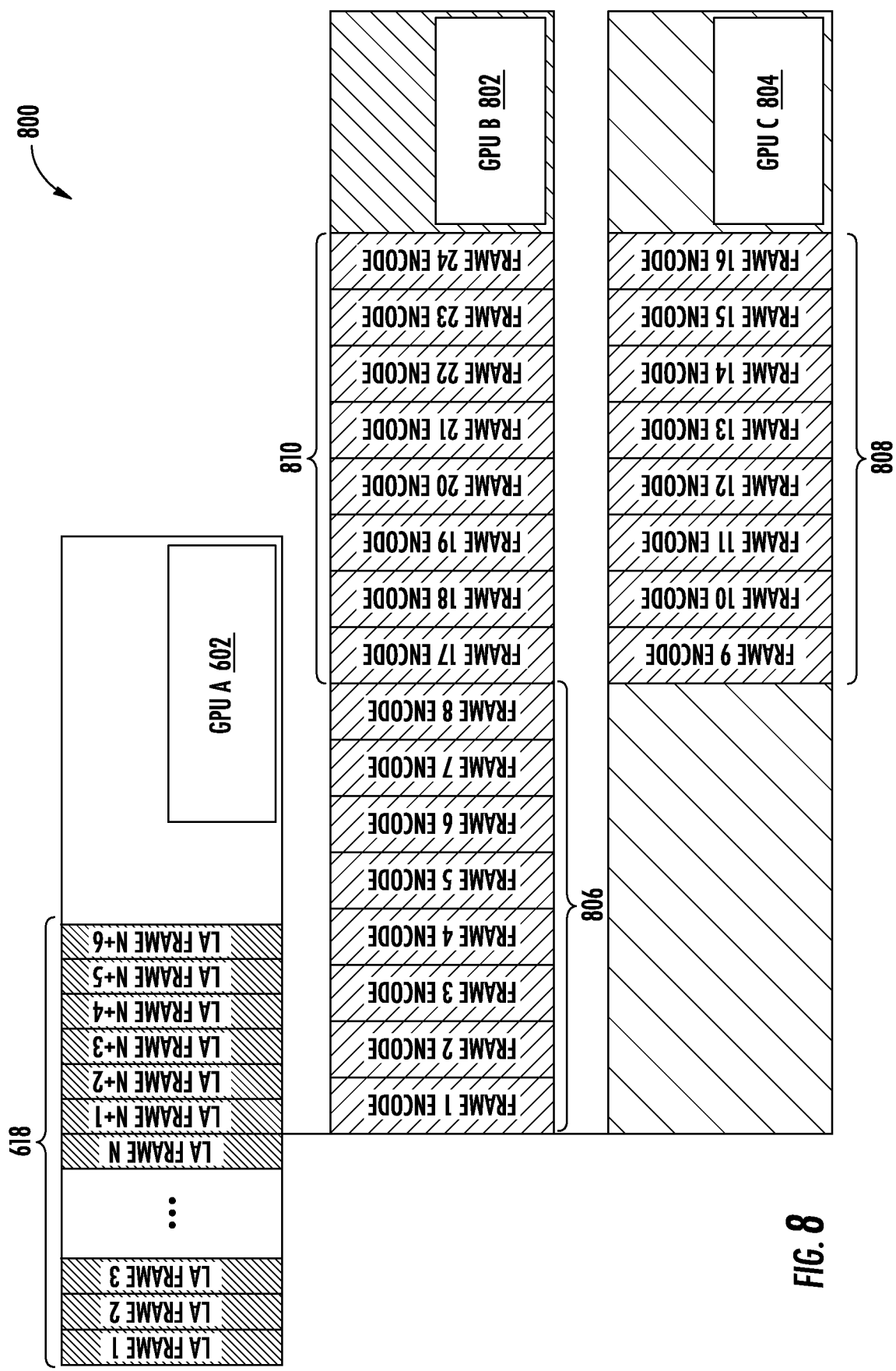
FIG. 8 illustrates an aspect of the subject matter in accordance with one embodiment.

FIG. 8 illustrates a block diagram showing technique 800 for multi-adapter look ahead encoding of frames where the look-ahead or first pass encoding of the present disclosure is combined with a group-of-pictures (GOP) based main encoding. Like FIG. 6, this figure depicts GPU A 602. In particular GPU A 602 is depicted performing the look-ahead encode 618 on a number of frames to generate encoding parameters (e.g., encoding parameters 324, or the like) as described herein.

FIG. 8 further depicts GPU B 802 and GPU C 804. GPU B 802 and GPU C 804 are arranged to execute a GOP based main encode. For example, GPU B 802 is depicted executing main encode on a first GOP 806 (e.g., frames 1 to 8) and a third GOP 810 (e.g., frames 17 to 24). Likewise, GPU C 804 is depicted executing main encode on a second GOP 808 (e.g., frames 9 to 16).

Figure 9:
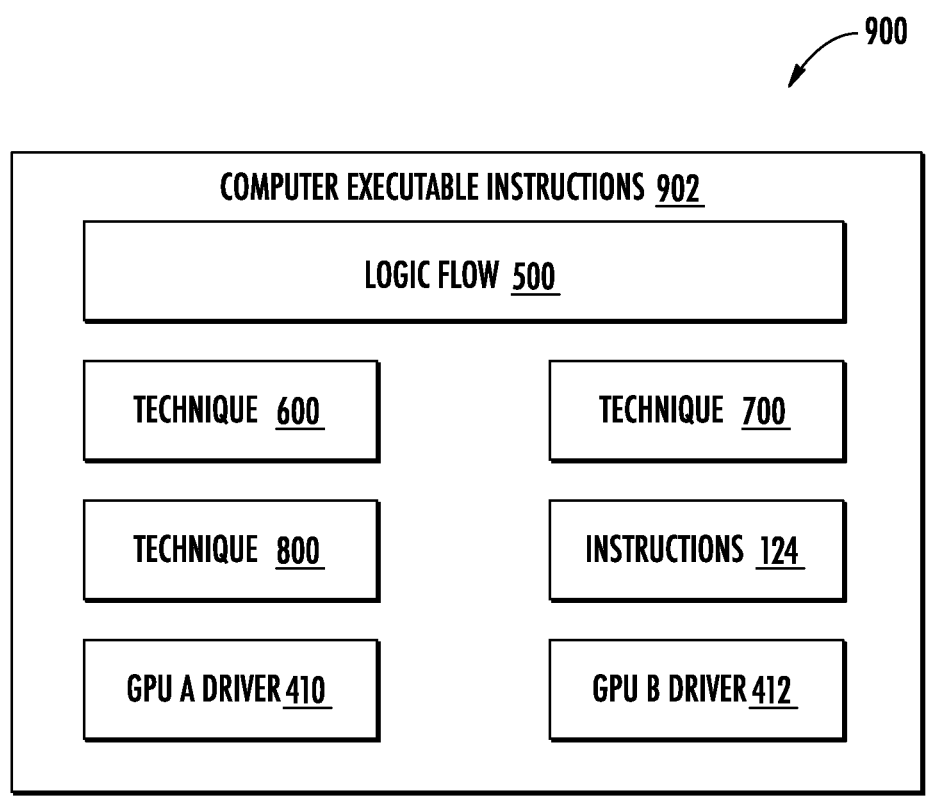
FIG. 9 illustrates a computer-readable storage medium 900 in accordance with one embodiment.

FIG. 9 illustrates computer-readable storage medium 900. Computer-readable storage medium 900 may comprise any non-transitory computer-readable storage medium or machine-readable storage medium, such as an optical, magnetic or semiconductor storage medium. In various embodiments, computer-readable storage medium 900 may comprise an article of manufacture. In some embodiments, computer-readable storage medium 900 may store computer executable instructions 902 with which circuitry (e.g., graphics processing unit 102, processor core 106, external graphics processing unit 120, processor 200, graphics processing unit 300, GPU A 404, GPU B 406, or the like) can execute. For example, computer executable instructions 902 can include instructions to implement operations described with respect to logic flow 500, technique 600, technique 700, technique 800, instructions 124, GPU A driver 410 and/or GPU B driver 412. Examples of computer-readable storage medium 900 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 902 may include any suitable type of code, such as source code, compiled code, interpreted code, executable code, static code, dynamic code, object-oriented code, visual code, and the like.

Figure 10:
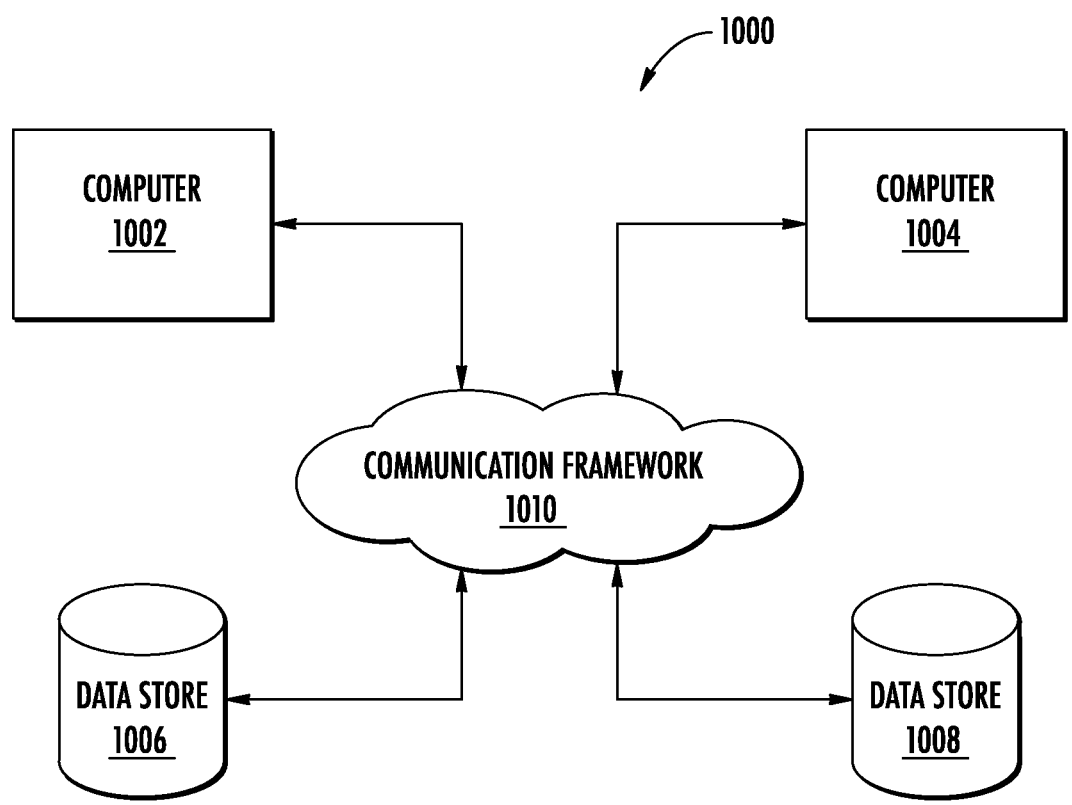
FIG. 10 illustrates an aspect of the subject matter in accordance with one embodiment.

FIG. 10 illustrates an exemplary communications communication architecture 1000 suitable for implementing various embodiments. For example, one or more computing devices (e.g., devices arranged to execute graphics workloads, or the like) may communicate with each other via a communication framework 1010, which may be a network implemented to facilitate electronic communication between devices. The communication architecture 1000 includes various common communications elements, such as a transmitter, receiver, transceiver, radio, network interface, baseband processor, antenna, amplifiers, filters, power supplies, and so forth. The embodiments, however, are not limited to implementation by the communication architecture 1000.

As shown in this figure, the communication architecture 1000 includes a computer 1002 and a computer 1004, which are operatively connected to one or more respective data stores, such as, data store 1006 and/or data store 1008. Data store 1006 and data store 1008 can be employed to store information local to the respective computers (e.g., computer 1002, computer 1004, etc.), such as data 126, raw frames 320, encoding parameters 324, encoded frames 322, frame size 328, etc.

Computer 1002 and computer 1004 may communicate information between each other using a communication framework 1010. Computer 1002 and computer 1004 may provide multi-adapter encoding of video streams as described herein, using communication framework 1010. In one example, computer 1002 may be implemented or configured to execute a first pass encoding while computer 1004 may be implemented or configured to execute a main encoding. The communication framework 1010 may implement any well-known communications techniques and protocols. The communication framework 1010 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1010 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by computer 1002 and computer 1004. Communication framework 1010 may be any one or combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

The following examples pertain to further embodiments, from which numerous permutations and configurations will be apparent.

Example 1. A computing apparatus comprising: a processor; first graphics processing circuitry; second graphics processing circuitry, the second graphics processing circuitry; and a memory device storing instructions, which when executed by the processor configure the apparatus to: receive a video stream at the first graphics processing circuitry, the video stream comprising indications of a plurality of frames; analyze a first set of the plurality of frames by the first graphics processing circuitry, the first set comprising at least a first frame and a second frame of the plurality of frames; generate, responsive to analyzing the first set of the plurality of frames, first encoding parameters for the first frame of the plurality of frames; provide, to the second graphics processing circuitry, an indication of the first frame of the plurality of frames and an indication of the first encoding parameters; and encode, by the second graphics processing circuitry, the first frame based on the indication of the first one of the plurality of frames and the indication of the first encoding parameters.

Example 2. The computing apparatus of example 1, the first of the plurality of frames comprising the first one of the plurality of frames through the Nth one of the plurality of frames, the memory device storing further instructions, which when executed by the processor configure the apparatus to: analyze, by the first graphics processing circuitry, the Nth+1 frame of the plurality of frames; generate, responsive to analyzing the Nth+1 frame of the plurality of frames, second encoding parameters for the second frame of the plurality of frames; provide, to the second graphics processing circuitry, an indication of the second frame of the plurality of frames and an indication of the second encoding parameters; and encode, by the second graphics processing circuitry, the second frame based on the indication of the second frame of the plurality of frames and the indication of the second encoding parameters.

Example 3. The computing apparatus of example 2, the memory device storing further instructions, which when executed by the processor configure the apparatus to: analyze, by the first graphics processing circuitry, the Nth+2 frame of the plurality of frames; generate, responsive to analyzing the Nth+2 frame of the plurality of frames, third encoding parameters for the third frame of the plurality of frames; provide, to third graphics processing circuitry, an indication of the third frame of the plurality of frames and an indication of the third encoding parameters; and encode, by the third graphics processing circuitry, the third frame based on the indication of the third frame of the plurality of frames and the indication of the third encoding parameters.

Example 4. The computing apparatus of any one of examples 1 to 3, the memory device storing further instructions, which when executed by the processor configure the apparatus to: decode, by the first graphics processing circuitry, the frames of the plurality of frames in the first set of the plurality of frames before analyzing the first set of the plurality of frames, wherein analyze the first set of the plurality of frames by the first graphics processing circuitry comprising analyzing the decoded frames of the plurality of frames in the first set of the plurality of frames.

Example 5. The computing apparatus of any one of example 1 to 4, the memory device storing further instructions, which when executed by the processor configure the apparatus to receive at the first graphics processing circuitry an indication of a frame size of the encoded first frame.

Example 6. The computing apparatus of any one of examples 1 to 5, wherein the second graphics processing circuitry comprises a first graphics process unit (GPU) and a second GPU, the memory device storing further instructions, which when executed by the processor configure the apparatus to: encode, by the first GPU, a first slice of the first frame; and encode, by the second GPU, a second slice of the first frame.

Example 7. The computing apparatus of any one of examples 1 to 6, wherein the first graphics processing circuitry comprising a first graphics process unit (GPU) and the second circuitry comprising a second GPU.

Example 8. The computing apparatus of example 7, wherein the first GPU supports a first encoding codec and the second GPU supports a second encoding codec different from the first encoding codec.

Example 9. The computing apparatus of example 7, wherein the first graphics processing circuitry comprises an integrated GPU and the second graphics processing circuitry comprises a dedicated GPU.

Example 10. The computing apparatus of example 7, wherein the first GPU comprises less computing resources, less memory, or less computing resources and less memory than the second GPU.

Example 11. The computing apparatus of any one of examples 1 to 10, wherein the first graphics processing circuitry is arranged to generate the first encoding parameters but not arranged to encode the first frame.

Example 12. The computing apparatus of any one of examples 1 to 10, wherein the first graphics processing circuitry comprises different circuitry from the circuitry of the second graphics processing circuitry.

Example 13. A method, comprising: receiving a video stream at first circuitry, the video stream comprising indications of a plurality of frames; analyzing a first set of the plurality of frames by the first circuitry, the first set comprising at least a first frame and a second frame of the plurality of frames; generating, responsive to analyzing the first set of the plurality of frames, first encoding parameters for the first frame of the plurality of frames; providing, to second circuitry different from the first circuitry, an indication of the first frame of the plurality of frames and an indication of the first encoding parameters; and encoding, by the second circuitry, the first frame based on the indication of the first one of the plurality of frames and the indication of the first encoding parameters.

Example 14. The method of example 13, the first of the plurality of frames comprising the first one of the plurality of frames through the Nth one of the plurality of frames, the method comprising: analyzing, by the first circuitry, the Nth+1 frame of the plurality of frames; generating, responsive to analyzing the Nth+1 frame of the plurality of frames, second encoding parameters for the second frame of the plurality of frames; providing, to the second circuitry, an indication of the second frame of the plurality of frames and an indication of the second encoding parameters; and encoding, by the second circuitry, the second frame based on the indication of the second frame of the plurality of frames and the indication of the second encoding parameters.

Example 15. The method of example 14, comprising: analyzing, by the first circuitry, the Nth+2 frame of the plurality of frames; generating, responsive to analyzing the Nth+2 frame of the plurality of frames, third encoding parameters for the third frame of the plurality of frames;

providing, to third circuitry, an indication of the third frame of the plurality of frames and an indication of the third encoding parameters, the third circuitry different from the first circuitry and the second circuitry; and encoding, by the third circuitry, the third frame based on the indication of the third frame of the plurality of frames and the indication of the third encoding parameters.

Example 16. The method of example 13, comprising: decoding, by the first circuitry, the frames of the plurality of frames in the first set of the plurality of frames before analyzing the first set of the plurality of frames, wherein analyzing the first set of the plurality of frames by the first circuitry comprising analyzing the decoded frames of the plurality of frames in the first set of the plurality of frames.

Example 17. The method of example 13, comprising receiving at the first circuitry an indication of a frame size of the encoded first frame.

Example 18. The method of example 13, wherein the second circuitry comprises a first graphics processing unit (GPU) and a second GPU, the method comprising: encoding, by the first GPU, a first slice of the first frame; and encoding, by the second GPU, a second slice of the first frame.

Example 19. The method of any one of examples 13 to 19, wherein the first circuitry comprising a first graphics processing unit (GPU) and the second circuitry comprising a second GPU.

Example 20. The method of example 19, wherein the first GPU supports a first encoding codec and the second GPU supports a second encoding codec different from the first encoding codec.

Example 21. The method of example 19, wherein the first graphics processing circuitry comprises an integrated GPU and the second graphics processing circuitry comprises a dedicated GPU.

Example 22. The method of example 19, wherein the first GPU comprises less computing resources, less memory, or less computing resources and less memory than the second GPU.

Example 23. The method of any one of examples 13 to 22, wherein the first graphics processing circuitry is arranged to generate the first encoding parameters but not arranged to encode the first frame.

Example 24. The method of any one of examples 13 to 22, wherein the first graphics processing circuitry comprises different circuitry from the circuitry of the second graphics processing circuitry.

Example 25. An apparatus, comprising means arranged to implement the function of any one of examples 13 to 24.

Example 26. A non-transitory computer-readable storage medium, the computer-readable storage medium including instructions that when executed by a computer, cause the computer to: receive a video stream at first circuitry, the video stream comprising indications of a plurality of frames; analyze a first set of the plurality of frames by the first circuitry, the first set comprising at least a first frame and a second frame of the plurality of frames; generate, responsive to analyzing the first set of the plurality of frames, first encoding parameters for the first frame of the plurality of frames; provide, to second circuitry, an indication of the first frame of the plurality of frames and an indication of the first encoding parameters; and encode, by the second circuitry, the first frame based on the indication of the first one of the plurality of frames and the indication of the first encoding parameters.

Example 27. The computer-readable storage medium of example 26, the first of the plurality of frames comprising the first one of the plurality of frames through the Nth one of the plurality of frames, the instructions, when executed by the computer, cause the computer to: analyze, by the first circuitry, the Nth+1 frame of the plurality of frames; generate, responsive to analyzing the Nth+1 frame of the plurality of frames, second encoding parameters for the second frame of the plurality of frames; provide, to the second circuitry, an indication of the second frame of the plurality of frames and an indication of the second encoding parameters; and encode, by the second circuitry, the second frame based on the indication of the second frame of the plurality of frames and the indication of the second encoding parameters.

Example 28. The computer-readable storage medium of example 27, the instructions, when executed by the computer, cause the computer to: analyze, by the first circuitry, the Nth+2 frame of the plurality of frames; generate, responsive to analyzing the Nth+2 frame of the plurality of frames, third encoding parameters for the third frame of the plurality of frames; provide, to third circuitry, an indication of the third frame of the plurality of frames and an indication of the third encoding parameters; and encode, by the third circuitry, the third frame based on the indication of the third frame of the plurality of frames and the indication of the third encoding parameters.

Example 29. The computer-readable storage medium of example 26, the instructions, when executed by the computer, cause the computer to: decode, by the first circuitry, the frames of the plurality of frames in the first set of the plurality of frames before analyzing the first set of the plurality of frames, wherein analyze the first set of the plurality of frames by the first circuitry comprising analyzing the decoded frames of the plurality of frames in the first set of the plurality of frames.

Example 30. The computer-readable storage medium of example 26, the instructions, when executed by the computer, cause the computer to receive at the first circuitry an indication of a frame size of the encoded first frame.

Example 31. The computer-readable storage medium of example 26, wherein the second circuitry comprises a first graphics process unit (GPU) and a second GPU, the instructions, when executed by the computer, cause the computer to: encode, by the first GPU, a first slice of the first frame; and encode, by the second GPU, a second slice of the first frame.

Example 32. The computer-readable storage medium of any one of examples 26 to 31, wherein the first circuitry comprising a first graphics process unit (GPU) and the second circuitry comprising a second GPU.

Example 33. The computer-readable storage medium of example 32, wherein the first GPU supports a first encoding codec and the second GPU supports a second encoding codec different from the first encoding codec.

Example 34. The computer-readable storage medium of example 32, wherein the first graphics processing circuitry comprises an integrated GPU and the second graphics processing circuitry comprises a dedicated GPU.

Example 35. The computer-readable storage medium of example 32, wherein the first GPU comprises less computing resources, less memory, or less computing resources and less memory than the second GPU.

Example 36. The computer-readable storage medium of any one of examples 26 to 35, wherein the first graphics processing circuitry is arranged to generate the first encoding parameters but not arranged to encode the first frame.

Example 37. The computer-readable storage medium of any one of examples 26 to 35, wherein the first graphics processing circuitry comprises different circuitry from the circuitry of the second graphics processing circuitry.

What is claimed is:

1. A computing apparatus, comprising:
    a processor;
    first graphics processing circuitry;
    second graphics processing circuitry; and
    a memory device storing instructions, which when executed by the processor configure the apparatus to:
        receive a video stream at the first graphics processing circuitry, the video stream comprising indications of a plurality of frames;
        decode a first set of the plurality of frames by the first graphics processing circuitry;
        analyze the first set of the plurality of frames by the first graphics processing circuitry, the first set comprising at least a first frame and a second frame of the plurality of frames;
        generate, responsive to analyzing the first set of the plurality of frames, first encoding parameters for the first frame of the plurality of frames;
        provide, to the second graphics processing circuitry, an indication of the first frame of the plurality of frames and an indication of the first encoding parameters; and
        encode, by the second graphics processing circuitry, the first frame based on the indication of the first one of the plurality of frames and the indication of the first encoding parameters.

2. The computing apparatus of claim 1, the first of the plurality of frames comprising the first one of the plurality of frames through an Nth one of the plurality of frames, the memory device storing further instructions, which when executed by the processor configure the apparatus to:
    analyze, by the first graphics processing circuitry, an Nth+1 frame of the plurality of frames;
    generate, responsive to analyzing the Nth+1 frame of the plurality of frames, second encoding parameters for the second frame of the plurality of frames;
    provide, to the second graphics processing circuitry, an indication of the second frame of the plurality of frames and an indication of the second encoding parameters; and
    encode, by the second graphics processing circuitry, the second frame based on the indication of the second frame of the plurality of frames and the indication of the second encoding parameters.

3. The computing apparatus of claim 2, the memory device storing further instructions, which when executed by the processor configure the apparatus to:
    analyze, by the first graphics processing circuitry, an Nth+2 frame of the plurality of frames;
    generate, responsive to analyzing the Nth+2 frame of the plurality of frames, third encoding parameters for the third frame of the plurality of frames;
    provide, to third graphics processing circuitry, an indication of the third frame of the plurality of frames and an indication of the third encoding parameters; and
    encode, by the third graphics processing circuitry, the third frame based on the indication of the third frame of the plurality of frames and the indication of the third encoding parameters.

4. The computing apparatus of claim 1, the memory device storing further instructions, which when executed by the processor configure the apparatus to receive at the first graphics processing circuitry an indication of a frame size of the encoded first frame.

5. The computing apparatus of claim 1, wherein the second graphics processing circuitry comprises a first graphics process unit (GPU) and a second GPU, the memory device storing further instructions, which when executed by the processor configure the apparatus to:
    encode, by the first GPU, a first slice of the first frame; and
    encode, by the second GPU, a second slice of the first frame.

6. The computing apparatus of claim 1, wherein the first graphics processing circuitry comprising a first graphics process unit (GPU) and the second circuitry comprising a second GPU.

7. The computing apparatus of claim 6, wherein the first graphics processing circuitry comprises an integrated GPU and the second graphics processing circuitry comprises a dedicated GPU.

8. The computing apparatus of claim 6, wherein the first GPU supports a first encoding codec and the second GPU supports a second encoding codec different from the first encoding codec.

9. The computing apparatus of claim 6, wherein the first GPU comprises less computing resources, less memory, or less computing resources and less memory than the second GPU.

10. A method, comprising:
    receiving a video stream at first circuitry, the video stream comprising indications of a plurality of frames;
    decoding a first set of the plurality of frames by the first circuitry;
    analyzing the first set of the plurality of frames by the first circuitry, the first set comprising at least a first frame and a second frame of the plurality of frames;
    generating, responsive to analyzing the first set of the plurality of frames, first encoding parameters for the first frame of the plurality of frames;
    providing, to second circuitry different from the first circuitry, an indication of the first frame of the plurality of frames and an indication of the first encoding parameters; and
    encoding, by the second circuitry, the first frame based on the indication of the first one of the plurality of frames and the indication of the first encoding parameters.

11. The method of claim 10, the first of the plurality of frames comprising the first one of the plurality of frames through an Nth one of the plurality of frames, the method comprising:
    analyzing, by the first circuitry, an Nth+1 frame of the plurality of frames;
    generating, responsive to analyzing the Nth+1 frame of the plurality of frames, second encoding parameters for the second frame of the plurality of frames;
    providing, to the second circuitry, an indication of the second frame of the plurality of frames and an indication of the second encoding parameters; and
    encoding, by the second circuitry, the second frame based on the indication of the second frame of the plurality of frames and the indication of the second encoding parameters.

12. The method of claim 11, comprising:
    analyzing, by the first circuitry, an Nth+2 frame of the plurality of frames;
    generating, responsive to analyzing the Nth+2 frame of the plurality of frames, third encoding parameters for the third frame of the plurality of frames;
    providing, to third circuitry, an indication of the third frame of the plurality of frames and an indication of the third encoding parameters, the third circuitry different from the first circuitry and the second circuitry; and encoding, by the third circuitry, the third frame based on the indication of the third frame of the plurality of frames and the indication of the third encoding parameters.

13. The method of claim 10, comprising receiving at the first circuitry an indication of a frame size of the encoded first frame.

14. A non-transitory computer-readable storage medium, the computer-readable storage medium including instructions that when executed by a computer, cause the computer to:

receive a video stream at first circuitry, the video stream comprising indications of a plurality of frames;

decode a first set of the plurality of frames by the first circuitry;

analyze the first set of the plurality of frames by the first circuitry, the first set comprising at least a first frame and a second frame of the plurality of frames;

generate, responsive to analyzing the first set of the plurality of frames, first encoding parameters for the first frame of the plurality of frames;

provide, to second circuitry different from the first circuitry, an indication of the first frame of the plurality of frames and an indication of the first encoding parameters; and encode, by the second circuitry, the first frame based on the indication of the first one of the plurality of frames and the indication of the first encoding parameters.

15. The computer-readable storage medium of claim 14, the first of the plurality of frames comprising the first one of the plurality of frames through an Nth one of the plurality of frames, the instructions, when executed by the computer, cause the computer to:

analyze, by the first circuitry, an Nth+1 frame of the plurality of frames;

generate, responsive to analyzing the Nth+1 frame of the plurality of frames, second encoding parameters for the second frame of the plurality of frames;

provide, to the second circuitry, an indication of the second frame of the plurality of frames and an indication of the second encoding parameters; and encode, by the second circuitry, the second frame based on the indication of the second frame of the plurality of frames and the indication of the second encoding parameters.

16. The computer-readable storage medium of claim 15, the instructions, when executed by the computer, cause the computer to:

analyze, by the first circuitry, an Nth+2 frame of the plurality of frames;

generate, responsive to analyzing the Nth+2 frame of the plurality of frames, third encoding parameters for the third frame of the plurality of frames;

provide, to third circuitry, an indication of the third frame of the plurality of frames and an indication of the third encoding parameters, the third circuitry different from the first circuitry and the second circuitry; and encode, by the third circuitry, the third frame based on the indication of the third frame of the plurality of frames and the indication of the third encoding parameters.

17. The computer-readable storage medium of claim 14, wherein the second circuitry comprises a first graphics process unit (GPU) and a second GPU, the instructions, when executed by the computer, cause the computer to:

encode, by the first GPU, a first slice of the first frame; and encode, by the second GPU, a second slice of the first frame.

* * * * *